United States Patent [19]
Koyama et al.

[11] Patent Number: 5,382,634
[45] Date of Patent: Jan. 17, 1995

[54] TERMINAL-MODIFED POLYOLEFINS

[75] Inventors: Naomi Koyama; Miyuki Usui; Hiroyuki Furuhashi; Satoshi Ueki, all of Iruma, Japan

[73] Assignee: Tonen Corporation, Tokyo, Japan

[21] Appl. No.: 232,304

[22] Filed: Apr. 25, 1994

Related U.S. Application Data

[63] Continuation of Ser. No. 952,759, Nov. 13, 1992, abandoned.

[30] Foreign Application Priority Data

| Mar. 15, 1991 | [JP] | Japan | 3-051389 |
| Mar. 18, 1991 | [JP] | Japan | 3-52639 |
| Mar. 18, 1991 | [JP] | Japan | 3-52640 |
| Mar. 18, 1991 | [JP] | Japan | 3-52641 |
| Nov. 8, 1991  | [JP] | Japan | 3-293213 |

[51] Int. Cl.$^6$ .................. C08F 297/08; C08F 210/06; C08F 210/16
[52] U.S. Cl. .................. 525/286; 525/247; 525/268; 525/288; 525/293; 525/303; 525/309
[58] Field of Search ............... 525/247, 268, 286, 288, 525/293, 303, 309

[56] References Cited

U.S. PATENT DOCUMENTS

| 3,989,768 | 11/1976 | Milkovich et al. | 525/285 |
| 4,695,557 | 9/1987  | Suzuki et al.    | 502/103 |
| 4,704,433 | 11/1987 | Ueki et al.      | 525/242 |
| 4,717,755 | 1/1988  | Doi et al.       | 525/333.7 |
| 4,801,654 | 1/1989  | Makishima et al. | 525/333.7 |
| 4,921,901 | 5/1990  | Ueki et al.      | 525/244 |

FOREIGN PATENT DOCUMENTS

| 0188915 | 12/1985 | European Pat. Off. |
| 0234114 | 12/1986 | European Pat. Off. |
| 0329891 | 10/1988 | European Pat. Off. |
| 0370753 | 5/1990  | European Pat. Off. |

OTHER PUBLICATIONS

Chemical Abstracts vol. 75, No. 26, 27 (Dec. 1971) No. 152609s "Modified Polyolefin Composites" abstract of JP-A-71021211 (Asahi Chemical Industry) Jun. 15, 1971.

*Primary Examiner*—Vasu S. Jagannathan
*Attorney, Agent, or Firm*—Wenderoth, Lind & Ponack

[57] ABSTRACT

The object of the present invention is to provide such a polyolefin that only the terminal of polypropylene or ethylene-propylene random copolymer is modified with a (meth)acrylic derivative unit to give a substantially monodipersed system. The feature thereof consists in such a polyolefin that the terminal of polypropylene or ethylene-propylene random copolymer obtained by living polymerization is modified with a (meth)acrylic derivative unit. As the (meth)acrylic derivative, there are used vinyl methacrylate, allyl methacrylate, trimethylsiloxyethyl methacrylate, 2-trimethylsiloxypropyl methacrylate, N, N-dimethylaminoethyl methacrylate, N,N-diethylaminoethyl methacrylate, glycidyl methacrylate, acrylic acid chloride and like.

4 Claims, No Drawings

TERMINAL-MODIFED POLYOLEFINS

This application is a continuation of Ser. No. 07/952,759, filed Nov. 13, 1992, now abandoned.

FIELD OF THE INVENTION

This invention relates to polyolefins whose terminals are modified with (meth)acrylic acid derivative units.

1. Background Technique

In the polymerization of α-olefins such as propylene, etc. by the Ziegler Natta catalyst of the prior art, a chain-transfer reaction or chain termination reaction takes place and accordingly, it is difficult to modify only the terminals of the polymer.

The present invention aims at providing such a polyolefin that only the terminals of polypropylene or ethylene-propylene random copolymer are modified with methacrylic acid (acrylic acid) derivative units to give a monodispersed system.

2. Disclosure of the Invention

The inventors have made various studies to achieve the object and consequently, have found that the object of the present invention can be achieved by reacting a living polypropylene or ethylene-propylene random copolymer obtained using a specified catalyst accompanying no chain-transfer reaction nor chain termination reaction with a methacrylic acid (acrylic acid) derivative.

Accordingly, the present invention provides such a terminal-modified polyolefin that the terminals of polypropylene or ethylene-propylene radom copolymer are modified with a substituent represented by the following General Formula I:

General Formula I

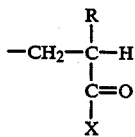

in which R is a hydrogen atom or methyl group, X is a halogen atom, in particular, Cl atom or OZ group wherein Z is an alkenyl group having terminal double bonds and 2 to 10 carbon atoms, $C_mH_{2m} \cdot OSiR^1R^2R^3$, $C_mH_{2m} \cdot OSi(R^4R^5)\text{-}OSiR^6R^7R^8$ or $C_mH_{2m} \cdot OH$ ($R^1 \sim R^3$, $R^4 \sim R^5$ and $R^6 \sim R^8$ are same or different alkyl groups containing 1 to 8 carbon atoms or aryl groups and m is an integer of 1 to 6), a group represented by the following formula,

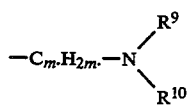

($R^9$ and $R^{10}$ are same or different alkyl groups containing 1 to 4 carbon atoms and m' is an integer of 1 to 4) and a group represented by the following formula,

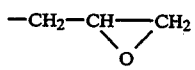

Best Embodiment for carrying out the Invention

The terminal-modified polyolefin of the present invention is ordinarily obtained in the form of such a composition that the terminal is represented by the following General Formula II, General Formula II

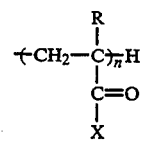

wherein R and X have the same meaning as described above and n is a numeral of 0.1 to 100.

The terminal-modified polyolefin of the present invention can be prepared by polymerizing propylene or random-copolymerizing ethylene and propylene in the presence of a catalyst consisting of an organic aluminum compound and a vanadium compound represented by the following General Formula III,

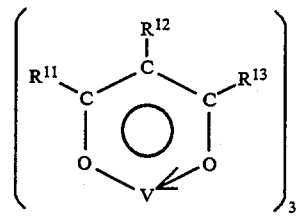

wherein $R^{11}$ to $R^{13}$ are hydrogen atoms or hydrocarbon groups of 1 to 8 carbon atoms and at least one of $R^{11}$ to $R^{13}$ must be a hydrogen atom, but all of $R^{11}$ to $R^{13}$ must not be hydrogen atoms, thus obtainging repectively living polypropylene or living ethylene-propylene copolymer, and then reacting the polypropylene or ethylene-propylene copolymer with a methacrylic acid (acrylic acid) derivative represented by the following General Formula IV,

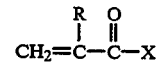

wherein R and X have the same meanings as described above, but excluding a case when X is OZ, Z is $C_mH_{2m} \cdot OH$. When Z is $C_mH_{2m} \cdot OH$, the above described polymers can be obtained by reacting a reaction product in the case of the above described Si-containing group with a proton donor.

Catalyst (a) Vanadium Compound

The vanadium compound used in the present invention is represented by the following General Formula III,

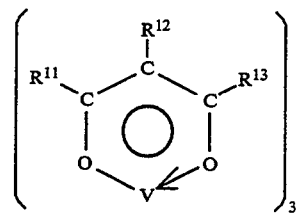

wherein $R^{11}$ to $R^{13}$ have the same meanings as described above.

Specific examples of the compound included in the above described general formula will now be illustrated.

Case where $R^{12}$ is a hydrogen atom and $R^{11}$ and $R^{13}$ are hydrocarbon groups:
$R^{11}/R^{13}$: $CH_3/CH_3$, $CH_3/C_2H_5$, $C_2H_5/C_2H_5$, $CH_3/C_6H_5$, $C_2H_5/C_6H_5$, $C_6H_5/C_6H_5$, $CH_3/C_6H_5CH_2$, $C_6H_5CH_2/C_6H_5CH_2$, $C_2H_5/C_6H_5CH_2$, $C_6H_5/C_6H_5CH_2$ Case where $R^{12}$ is a hydrocarbon group and one of $R^{11}$ and $R^{13}$ is a hydrogen atom and the other is a hydrocarbon group:
$R^{12}/R^{11}$ or $R^{13}$:$CH_3/CH_3$, $C_2H_5/CH_3$, $CH_3/C_2H_5$, $C_2H_5/C_2H_5$, $C_6H_5/CH_3$, $CH_3/C_6H_5$, $C_6H_5/C_2H_5$. $C_2H_5/C_6H_5$, $C_6H_5/C_6H_5$, $C_6H_5CH_2/CH_3$, $CH_3/C_6H_5CH_2$, $C_6H_5CH_2/C_6H_5CH_2$, $C_6H_5CH_2/C_2H_5$. $C_2H_5/C_6H_5CH_2$, $C_6H_5CH_2/C_6H_5$, $C_6H_5/C_6H_5CH_2$ Case where $R^{12}$ is a hydrogen atom and one of $R^{11}$ and $R^{13}$ is a hydrogen atom and the other is a hydrocarbon group:
$R^{11}$ or $R^{13}$: $CH_3$, $C_2H_5$, $C_6H_5$, $C_6H_5CH_2$ Above all, the following compounds are preferable.

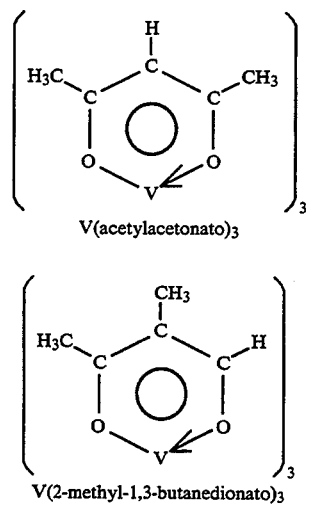

V(acetylacetonato)$_3$

V(2-methyl-1,3-butanedionato)$_3$ (b) Organoaluminum Compound

As the organoaluminum compound, there are used those represented by the general formula $R^{14}{}_{n'}AlX'_{3-n'}$ wherein $R^{14}$ is an alkyl or aryl group, X is a halogen atom or hydrogen atom and n is any numeral in the range of $1 \leq n < 3$, for example, alkylaluminum compounds containing 1 to 18 carbon atoms, preferably 2 to 6 carbon atoms, such as dialkylaluminummonohalide, monoalkylaluminum dihalide and alkylaluminum sesquihalide, mixtures or complex compounds thereof. Specifically, there are dialkylaluminum monohalides such as dimethylaluminum chloride, diethylaluminum chloride, diethylaluminum bromide, diethylaluminum iodide, diisobutylaluminum chloride, etc., monoalkyl aluminum dihalides such as methylaluminum dichloride, ethylaluminum dichloride, methylaluminum dibromide, ethylaluminum dibromide, ethylaluminum diiodide, isobutylaluminum dichloride, etc., alkylaluminum sesquihalide such as ethylaluminum sesquichloride, etc.

The proportion of the vanadium compound and organoaluminum compound used is generally 1 to 1,000 moles of the organoaluminum compound per 1 mole of the vanadium compound.

Living polymerization of Propylene

The living polymerization of propylene includes homopolymerization of propylene and copolymerization of propylene with a small amount of ethylene or α-olefins such as 1-butene, 1-hexene, 4-methyl-1-pentene and the like.

The polymerization reaction is preferably carried out in a solvent inert to the polymerization reaction and liquid during the polymerization, for example, saturated aliphatic hydrocarbons such as propane, butane, pentane, hexane, heptane, etc., saturated alicyclic hydrocarbons such as cyclopropane, cyclohexane, etc. and aromatic hydrocarbons such as benzene, toluene, xylene, etc.

The amount of a polymerization catalyst used in the polymerization of propylene is, per 1 mole of propylene or propylene with a small amount of a comonomer, $1 \times 10^{-4}$ to 0.1 mole, preferably $5 \times 10^{-4}$ to $5 \times 10^{-2}$ mole of a vanadium compound and $1 \times 10^{-4}$ to 0.5 mole, prefrably $1 \times 10^{-3}$ to 0.1 mole of an organoaluminum compound. The organoaluminum compound is preferably used in a proportion of 4 to 100 moles to 1 mole of the vanadium compound.

The living polymerization is generally carried out at $-100°$ C. to $+100°$ C. for 0.5 to 50 hours.

The molecular weight and yield of the resulting living polypropylene can be controlled by changing the reaction temperature and reaction time. When the polymerization temperature is adjusted to a low temperature, in particular, at most $-30°$ C., there can be obtained a polymer with a substantially monodispersed molecular weight distribution. At a temperature of at most $-50°$ C., there can be obtained a living polymer with an Mw (weight average molecular weight)/Mn (number average molecular weight) ratio of 1.05 to 1.40.

In the polymerization reaction, a reaction accelerator can be used. As the reaction accelerator, there are used anisole, water, oxygen, alcohols such as methanol, ethanol, isopropanol and the like, esters such as ethyl benzoate, ethyl acetate, etc. The amount of the accelerator used is ordinarily 0.1 to 2 moles per 1 mole of a vanadium compound.

In this way, a living polypropylene having a number average molecular weight of about 500 to 500,000 and a substantially monodispersed system can be produced.

Living Random Copolymerization of Ethylene-Propylene

The polymerization reaction is preferably carried out in a solvent inert to the polymerization reaction and liquid in the polymerization, for example, saturated aliphatic hydrocarbons such as propane, butane, pentane, hexane, heptane, etc., saturated alicyclic hydrocarbons such as cyclopropane, cyclohexane, etc. and aromatic hydrocarbons such as benzene, toluene, xylene, etc.

Contacting of ethylene and propylene with a polymerization catalyst can be carried out by a suitable method, preferably by a method comprising adding, in order, a solution of an organoaluminum compound and a solution of a vanadium compound to a solvent solution of ethylene and propylene and contracting them, or a method comprising adding ethylene and propylene to a solvent solution of an organoaluminum compound and vanadium compound and contacting them.

The amount of a polymerization catalyst used in the copolymerization is, per 1 mole of ethylene and propylene, $1 \times 10^{-4}$ to 0.1 mole, preferably $5 \times 10^{-4}$ to $5\times10^{-2}$ mole of a vanadium compound and $1\times10^{-4}$ to 0.5 mole, prefrably $1\times10^{-3}$ to 0.1 mole of an organoaluminum compound. The organoaluminum compound is preferably used in a proportion of 4 to 100 moles to 1 mole of the vanadium compound.

The molecular weight and yield of the resulting living copolymer can be controlled by changing the reaction temperature and reaction time. When the polymerization temperature is adjusted to a low temperature in the present invention, in particular, at most $-30°$ C., there can be obtained a polymer having a substantially monodispersed molecular weight distribution. At a temperature of at most $-50°$ C., there can be obtained a living ethylene-propylene random copolymer with an Mw (weight average molecular weight)/Mn (number average molecular weight) ratio of 1.05 to 1.40.

In the polymerization reaction, a reaction accelerator can be used. As the reaction accelerator, there are used anisole, water, oxygen, alcohols such as methanol, ethanol, isopropanol and the like, esters such as ethyl benzoate, ethyl acetate, etc. The amount of the accelerator used is ordinarily 0.1 to 2 moles per 1 mole of a vanadium compound.

The ratio of ethylene and propylene in the living copolymer is ordinarily upto 90 mole % of ethylene. This can be controlled by changing the ratio of ethylene and propylene used in the living polymerization, but if the amount of ethylene used is increased, the molecular weight distribution of the copolymer is widened, which is not preferable. When it is desired to produce a living copolymer with a higher ethylene content and a narrower molecular weight distribution, i.e. near monodisperse, a very small amount of propylene is added to the polymerization system before the living copolymerization of ethylene and propylene and maintained for 0.1 to 1 hour, whereby a larger amount of ethylene can be introduced into the copolymer while maintaining narrow the molecular weight distribution of the living copolymer.

In this way, a living ethylene-polypropylene random copolymer having a number average molecular weight (in terms of propylene, to be repeated in the following) of about 500 to 500,000 and a substantially monodispersed system can be produced.

Reaction with Methacrylic Acid (Acrylic Acid) Derivative

A methacrylic acid (acrylic acid) derivative (which will hereinafter be referred to as Compound I) to be reacted with a living polypropylene or ethylene-propylene random copolymer is represented by the following General Formula IV,

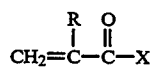
              IV wherein R and X have the same meaning as described above. Specifically, the methacrylic acid (acrylic acid) derivative is as follows:

Represented by General Formula V

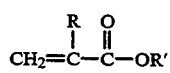
              V wherein R is a hydrogen atom or methyl group and R' is an alkenyl group such as vinyl, allyl, α-butenyl, α-pentenyl, α-hexenyl, 4-methyl-1-pentenyl, etc.

Represented by General Formula VI

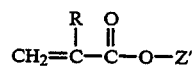
              VI in which R is a hydrogen atom or methyl group, Z' is $C_mH_{2m}\cdot OSiR^1R^2R^3$ or $C_mH_{2m}\cdot OSi(R^4R^5)OSiR^6R^7R^8$, m is an integer of 1 to 6 and $R^1\sim R^3$, $R^4\sim R^5$ and $R^6\sim R^8$ are same or different alkyl groups containing 1 to 8 carbon atoms or aryl groups such as phenyl, tolyl and xylyl groups. Above all, alkyl groups containing 1 to 4 carbon atoms, such as methyl, ethyl, (n, i-)propyl and (n, i, s, t-)butyl groups are particularly preferable. In addition, $R^1\sim R^3$, $R^4\sim R^5$ and $R^6\sim R^8$ are preferably an independent same group.

In this specification, "." in ".OSiR$^1$R$^2$R$^3$". ".OSi(R$^4$R$^5$)OSiR$^6$R$^7$R$^8$" and ".OH" means bonding to any carbon atom in the alkylene group $C_mH_{2m}$.

Represented by General Formula VII

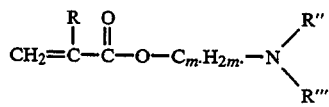
              VII in which R, R" and R''' and m' have the same meanings as described above. Specifically, R" and R''' are methyl, ethyl, n-propyl, i-propyl, n-butyl, i-butyl, s-butyl and t-butyl groups. $C_{m'}H_{2m'}$ is an alkylene group, preferably a linear alkylene group of the formula $(CH_2)_{m'}$.

Typical examples of Compound I are, in addition to the above described:

Glycidyl (Meth)acrylate

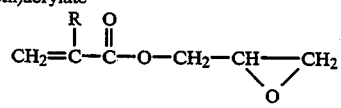

(Meth)acrylic Acid Chloride

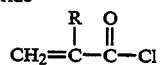

The reaction of a living polypropylene or ethylene-propylene random copolymer with Compound I is preferably carried out by feeding Compound I to a reaction system in which the living polypropylene or ethylene-propylene random copolymer is present. The reaction is carried out at a temperature of $-100°$ C. to $+150°$ C. for 5 minutes to 50 hours. The modification efficiency of the terminal of a polyolefin with Compound I unit can be increased by raising the temperature or lengthening the reaction time.

Compound I is generally used in a proportion of 1 to 1,000 moles to 1 mole of a living polyolefin.

The reaction product of a living polypropylene or ethylene-propylene random copolymer with Compound I is then brought into contact with a proton donor to obtain a terminal-modified polyolefin according to the present invention. As the proton donor, there are used alcohols such as methanol, ethanol, phenol and the like, and mineral acids such as hydrochloric acid, sulfuric acid and the like. The alcohol and mineral acid can simultaneously be used. Generally, the proton donor is used in a largely excessive quantity. Contacting with the proton donor is generally carried out at $-100°$ C. to +150° C. for 1 minute to 50 hours, preferably at −100° C. to +100° C. for 1 minute to 10 hours.

When using the foregoing (meth)acrylic acid derivative of General Formula VI, the terminal-modified polyolefin is obtained corresponding to a case where Z in the substituent of General Formula I is $C_mH_{2m}.OSiR^1R^2R^3$ or $C_mH_{2m}.OSi(R^4R^5)OSiR^6R^7R^8$.

Furthermore, the terminal-modified polyolefin of the present invention corresponding to a ease where Z is $C_mH_{2m}.OH$ can be prepared by reacting the thus obtained terminal-modified polyolefin with a proton donor.

As the proton donor, there are used alcohols such as methanol, ethanol, phenol and the like, and mineral acids such as hydrochloric acid, sulfuric acid and the like. The alcohol and mineral acid can simultaneously be used. Generally, the proton donor is used in a largely excessive quantity. Contacting with the proton donor is generally carried out at −100° C. to +100° C. for 1 minute to 10 hours.

The polyolefin of the present invention, obtained in this way, has a number average molecular weight (Mn) of about 500 to 500,000 and a very narrow molecular weight distribution (Mw/Mn=1.05 to 1.40) corresponding to the foregoing living polypropylene or ethylene-propylene random copolymer itself, whose terminals are modified with 0.1 to 100 units, preferably 0.1 to 50 units, more preferably 0.2 to 20 units of the foregoing Compound I.

However, when X in General Formula I is represented by:

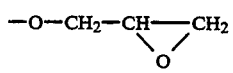

the terminals are modified with 0.1 to 500 units, preferably 0.2 to 100 units, more preferably 0.5 to 50 units of the foregoing Compound I and when X is Cl, the terminals are modified with 0.1 to 100 units, preferably 0.2 to 50 units, more preferably 0.3 to 25 units of the foregoing Compound I.

One of the features of the terminal-modified polypropylene according to the present invention consists in that the syndiotactic dyad fraction is at least 0.6.

EXAMPLES

The present invention will be illustrated by the following examples, in which characterization of the polymers was carried out by the following methods:

Molecular Weight and Molecular Weight Distribution

GPC (gel permeation chromatography) Model 150 (commercial name, made by Waters Co.) was used. Solvent: o-dichlorobenzene; Measuring Temperature: 135° C.; Solvent Flow Rate: 1.0 ml/min; Column: GMH 6HT (commercial name, made by Toso KK). For the measurement, a standard sample of a monodispersed polystyrene made by Toso KK was used and a calibration curve of polystyrene was sought, from which a calibration curve of polypropylene was prepared by the universal method.

Determination of Structure of Polymer ($^1$H-NMR Spectrum): Measurement was carried out using a NMR spectrometer of Fourier transformation type, GSX-400 (commercial name, made by Nippon Denshi KK) at 400 MHz, 30° C. and a pulse interval of 15 seconds. A sample was dissolved in dichloroform and prepared.

($^{13}$C-NMR Spectrum): Measurement was carried out using a NMR spectrometer of XL-200 type (commercial name, made by Variant Co.) equipped with a PFT (Pulse Fourier Transformation) means at 50 MHz, 120° C., a pulse width of 8.2 μs π/3, a pulse interval of 4 seconds and an integrating number of 5,000. A sample was dissolved in a mixed solvent of trichlorobenzene and benzene (2:1) and prepared.

Infrared Absorption Spectrum

A polymer was cast on a plate of KBr and subjected to measurement using an infrared spectro photometer, Model IR-810 (commercial name, made by Nippon Bunko Kogyo KK).

EXAMPLE 1

Living Polymerization of Propylene 30 ml of toluene was charged in a flask of 300 ml, sufficiently replaced by nitrogen gas, and then cooled at −60° C., to which 200 millimoles of propylene was added at the same temperature, followed by dissolving in the toluene. A solution of 15 millimoles of $Al(C_2H_5)_2Cl$ in toluene and a solution of 1.5 millimole of V(2-methyl-1,3-butanedionato)$_3$ in toluene were then added thereto and stirred to start polymerization. The polymerization of propylene was carried out at −60° C. for 1 hour.

Reaction with Vinyl Methacrylate 100 millimoles of vinyl methacrylate (VMA) was added to the above described reaction system at the same temperature and reacted for 1 hour.

Then, the reaction solution was poured in 500 ml of ethanol to precipitate a polymer. The precipitate was dissolved in n-heptane and subjected to centrifugal separation to obtain a supernatant, which was then poured in 500 ml of methanol to precipitate again a polymer. The resulting polymer was washed with methanol five times and dried under reduced pressure at room temperature to obtain 1.15 g of a polymer.

The resulting polymer exhibited a GPC curve with a single peak and had an Mn of $3.5 \times 10^3$ and Mw/Mn of 1.23, near monodisperse.

When this polymer was subjected to measurement of the infrared absorption spectrum (IR), there were found an absorption due to stretching vibration of carbonyl at 1740 cm$^{-1}$ and an absorption due to stretching vibration of C=C at 1640 cm$^{-1}$. Moreover, when measurement of $^1$H-NMR was carried out, a peak of the following chemical shift value was observed in addition to a peak (δ=0.7~1.7 ppm) due to the proton of the polypropylene:

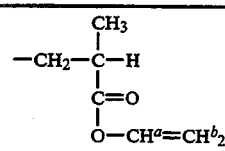

| Assignment | Chemical Shift Value (ppm: TMS Standard) |
|---|---|
| a | 7.1 |
| b | 4.6, 4.9 |

It was found from the area ratio of the proton signal (δ=0.7~1.7 ppm) of the polypropylene moiety and the above described signal (a) that the resulting polymer had 8 VMA units incorporated at the terminals of polypropylene, as described below.

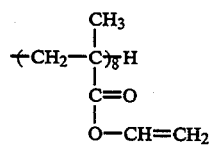

In order to determine the syndiotactic dyad fraction of the resulting polypropylene, in addition, living polymerization of propylene was carried out in the same manner as described above and the reaction solution was rapidly added to 500 ml of a solution of ethanol and hydrochloric acid cooled to $-78°$ C. to stop the polymerization. The separated polymer was washed with 500 ml of ethanol five times and dried at room temperature to obtain polypropylene.

Then, the resulting polypropylene was subjected to $^{13}$C-NMR analysis. The stereoregularity of the polypropylene, calculated from the multiplet intensity ratio of methyl carbon of spectrum, is shown in the following:

| Triad Fraction | | | Dyad Fraction[a] |
|---|---|---|---|
| [rr] | [rm] | [mm] | [r] |
| 0.629 | 0.314 | 0.057 | 0.786 |

[a]calculated from triad fraction

EXAMPLES 2 TO 4

Example 1 was repeated except that the reaction conditions of propylene and VMA were varied as shown in Table 1 to obtain a terminal-modified polypropylene. The results are shown in Table 1.

EXAMPLE 5

400 ml of n-heptane was charged in an autoclave of 1500 ml, sufficiently replaced by nitrogen gas, and then cooled at $-60°$ C., to which 200 g of propylene was added at the same temperature, followed by liquefying and dissolving in the n-heptane. A solution of 50 millimoles of $Al(C_2H_5)_2Cl$ in n-heptane and and a solution of 0.6 millimole of V(2-methyl-1,3-butanedionato)$_3$ in toluene were then added thereto and stirred to start polymerization. The polymerization was continued for 15 hours.

800 millimoles of VMA was added to the above described reaction system at the same temperature and the reaction with VMA was carried out for 20 hours, followed by treating in an analogous manner to Example 1 to obtain a terminal-modified polypropylene having the properties shown Table 1.

EXAMPLE 6

100 ml of n-heptane was charged in an autoclave of 300 ml, sufficiently replaced by nitrogen gas, and then cooled at $-78°$ C., to which 200 millimoles of propylene was added at the same temperature, followed by liquefying and dissolving in the n-heptane. A solution of 15 millimoles of $Al(C_2H_5)_2Cl$ in n-heptane and a solution of 1.5 millimole of V(acetylacetonato)$_3$ in toluene were then added thereto and stirred to start polymerization. The polymerization of propylene was carried out at $-78°$ C. for 3 hours.

Then, the reaction with VMA was carried out in an analogous manner to Examle 1 to obtain a terminal-modified polypropylene having the properties shown Table 1.

EXAMPLE 7

Example 1 was repeated except using allyl methacrylate (AMA) in place of VMA to obtain a polymer.

When this polymer was subjected to measurement of IR, there were found an absorption due to stretching vibration of carbonyl at 1740 cm$^{-1}$ and an absorption due to stretching vibration of C=C at 1640 cm$^{-1}$. Moreover, when measurement of $^1$H-NMR was carried out, a peak of the following chemical shift value was observed in addition to a peak ($\delta = 0.7 \sim 1.7$ ppm) due to the proton of the polypropylene. It was thus found that the resulting polymer was such a mixture that the following units (1) and (2) were respectively bonded to the terminals of polypropyrene.

(1)
$$-CH_2-CH^a \atop \underset{O-CH^b_2-CH^c=CH^d_2}{|\atop C=O}$$

(2) $-CH_2-CH^e=CH^f_2$

| Assignment | Chemical Shift Value (ppm: TMS Standard) |
|---|---|
| a | 2.5 |
| b | 4.5 |
| c | 5.9 |
| d | 5.2~5.4 |
| e | 5.8 |
| f | 5.0 |

It was found from the area ratio of the proton signal ($\delta = 0.7 \sim 1.7$ ppm) of the polypropylene moiety and the above described signal (d) and signal (f) that the resulting polymer was such a mixture that 40 mole % of the above described unit (1) and 60 mole % of the above described unit (2) were respectively bonded to the terminals thereof per 1 mole of the polypropylene.

TABLE 1

| | Polymerization Conditions of Propylene | | Reaction Conditions of Compound I | | Polymer | | | |
|---|---|---|---|---|---|---|---|---|
| Examples | Temp. (°C.) | Time (Hr) | Temp. (°C.) | Time (Hr) | Yield (g) | Mn (×10$^3$) | Mw/Mn | n Value in General Formula |
| 1 | −60 | 1 | −60 | 1 | 1.15 | 3.5 | 1.23 | 8 |
| 2 | −60 | 2 | 0 | 5 | 2.13 | 6.4 | 1.22 | 9 |
| 3 | −60 | 3 | −40 | 5 | 3.36 | 9.3 | 1.20 | 14 |
| 4 | −70 | 2 | −60 | 5 | 1.20 | 3.9 | 1.24 | 13 |
| 5 | −60 | 15 | −60 | 20 | 37.4 | 97.4 | 1.32 | 19 |
| 6 | −78 | 3 | −60 | 1 | 0.65 | 6.6 | 1.19 | 7 |

TABLE 1-continued

| Examples | Polymerization Conditions of Propylene | | Reaction Conditions of Compound I | | Polymer | | | |
|---|---|---|---|---|---|---|---|---|
| | Temp. (°C.) | Time (Hr) | Temp. (°C.) | Time (Hr) | Yield (g) | Mn (×10³) | Mw/Mn | n Value in General Formula |
| 7 | −60 | 1 | −60 | 1 | 1.07 | 2.9 | 1.21 | 0.4 |

EXAMPLE 8

Synthesis of Living Ethylene-Propylene Random Copolymer 250 ml of n-heptane was charged in an autoclave of 500 ml, sufficiently replaced by nitrogen gas, and then cooled at −60° C., to which a solution of 15 millimoles of Al(C₂H₅)₂Cl in n-heptane and a solution of 1.5 millimole of V(2-methyl-1,3-butanedionato)₃ in toluene were then added at the same temperature. After evacuating the system to 700 mmHg, a mixed gas of ethylene and propylene (40/60 mole ratio) was continuously fed thereto and copolymerization of ethylene-propylene was effected at −60° C. for 1 hour, thus synthesizing a living ethylene-propylene random copolymer (hereinafter referred to as EPR).

On the other hand, in order to determine the molecular weight, molecular weight distribution and propylene content of the ethylene-propylene copolymer moiety, ethylene and propylene were copolymerized in the same manner as described above, thus obtaining 1.83 g of EPR with an Mn of $6.8 \times 10^3$ and Mw/Mn ratio of 1.21. Further, this copolymer was subjected to a ¹³C-NMR measurement and a propylene content was calculated from areas of a peak (S) assigned to secondary carbon and a peak (T) assigned to tertiary carbon, based on the following formula. Conequently, the propylene content of the copolymer was 52.7 mole %.

Propylene Content (mole %) = {T/½(S+T)} × 100

When this copolymer was subjected to thermal analysis by a differential scanning calorimeter (DSC), a glass transition temperature (about −10° C.) due to propylene homopolymer was not observed.

Reaction with Vinyl Methacrylate 250 millimoles of vinyl methacrylate (VMA) was added to the above described reaction system at the same temperature and reacted for 1 hour.

Then, the reaction solution was poured in 500 ml of ethanol to precipitate a polymer. The resulting polymer was dissolved again in n-heptane and subjected to centrifugal separation to obtain a supernatant, which was then poured in 500 ml of methanol to precipitate again a polymer. The resulting polymer was washed with methanol five times and dried under reduced pressure at room temperature to obtain 1.92 g of a polymer.

The resulting polymer exhibited a GPC curve with a single peak and had an Mn of $7.1 \times 10^3$ and Mw/Mn of 1.23, near monodisperse.

When this polymer was subjected to IR analysis, there were found an absorption due to stretching vibration of carbonyl at 1740 cm⁻¹ and an absorption due to stretching vibration of C=C at 1640 cm⁻¹. Moreover, as a result of ¹H-NMR analysis, a peak of the following chemical shift value was observed in addition to a peak (δ=0.7~1.7 ppm) due to the proton of the EPR moiety.

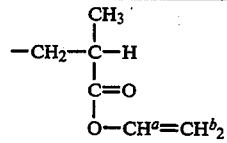

| Assignment | Chemical Shift Value (ppm: TMS Standard) |
|---|---|
| a | 7.1 |
| b | 4.5, 4.9 |

It was found from the area ratio of the proton signal (δ=0.7~1.7 ppm) of the EPR moiety and the above described signal (a), and the propylene content and molecular weight of EPR that the resulting polymer had 7 VMA units incorporated at the terminals of EPR, as described below.

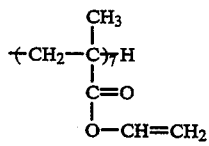

EXAMPLE 9

800 ml of n-heptane was charged in an autoclave of 1500 ml, sufficiently replaced by nitrogen gas, and then cooled at −60° C., to which 1.5 g of propylene was added at the same temperature, followed by liquefying and dissolving in the n-heptane. A solution of 40 millimoles of Al(C₂H₅)₂Cl in n-heptane and and a solution of 0.8 millimole of V(2-methyl-1,3-butanedionato)₃ in toluene were then added thereto and stirred at −60° C. for 10 minutes. After the system was evacuated to 680 mmHg, a mixed gas of ethylene and propylene (50/50 mole ratio) was continuously fed to the system and copolymerization of ethylenepropylene was carried out at −60° C. for 10 hours, thus synthesizing a living EPR.

500 millimoles of VMA was then added to the above described reaction system at the same temperature, the temperature of the reaction system was raised to −40° C. for 1 hour and the reaction with VMA was carried out for 10 hours, followed by treating in an analogous manner, to Example 8 to obtain a terminal-modified EPR having the properties show in Table 2.

On the other hand, ethylene and propylene were copolymerized in the same manner as described above, thus obtaining 23.9 g of EPR with an Mn of $101.4 \times 10^3$, Mw/Mn ratio of 1.26 and propylene content of 48.6 mole %.

EXAMPLE 10

250 ml of toluene was charged in an autoclave of 500 ml, sufficiently replaced by nitrogen gas, and then cooled at −60° C., to which 0.2 g of propylene was added at the same temperature, followed by liquefying and dissolving in the tolene. A solution of 15 millimoles of Al(C$_2$H$_5$)$_2$Cl in n-heptane and a solution of 2.0 millimoles of V(2-methyl-1,3-butanedionato)$_3$ in toluene were then added thereto and stirred at −60° C. for 10 minutes. After the system was evacuated to 720 mmHg, a mixed gas of ethylene and propylene (60/40 mole ratio) was continuously fed to the system and copolymerization of ethylenepropylene was carried out at −60° C. for 2 hours, thus synthesizing a living EPR.

250 millimoles of VMA was then added to the above described reaction system at the same temperature, the temperature of the reaction system was raised to 0° C. for 1 hour and the reaction with VMA was carried out at 0° C. for 5 hours, followed by treating in an analogous manner to Example 8 to obtain a terminal-modified EPR having the properties shown Table 2.

On the other hand, ethylene and propylene were copolymerized in the same manner as described above, thus obtaining 2.14 g of EPR with an Mn of 5.1×10$^3$, Mw/Mn ratio of 1.26 and propylene content of 38.6 mole %.

EXAMPLE 11

250 ml of toluene was charged in an autoclave of 500 ml, sufficiently replaced by nitrogen gas, and then cooled at −78° C., to which a solution of 15 millimoles of Al(C$_2$H$_5$)$_2$Cl in n-heptane and a solution of 1.5 millimoles of V(acetylacetonato)$_3$ in toluene were then added. After the system was evacuated to 700 mmHg, a mixed gas of ethylene and propylene (40/60 mole ratio) was continuously fed to the system and copolymerization of ethylene-propylene was carried out at −78° C. for 3 hours, thus synthesizing a living EPR.

250 millimoles of VMA was then added to the above described reaction system at the same temperature and the reaction with VMA was carried out at −60° C. for 3 hours, followed by treating in an analogous manner to Example 8 to obtain a terminal-modified EPR having the properties shown Table 2.

On the other hand, ethylene and propylene were copolymerized in the same manner as described above, thus obtaining 1.54 g of EPR with an Mn of 8.7×10$^3$, Mw/Mn ratio of 1.26 and propylene content of 55.3 mole %.

EXAMPLE 12

Example 8 was repeated except using allyl methacrylate (AMA) in place of VMA to obtain a polymer.

When this polymer was subjected to IR analysis, there were found an absorption due to stretching vibration of carbonyl at 1740 cm$^{-1}$ and an absorption due to stretching vibration of C=C at 1640 cm$^{-1}$. Moreover, as a result of $^1$H-NMR analysis, a peak of the following chemical shift value was observed in addition to a peak ($\delta = 0.7 \sim 1.7$ ppm) due to the proton of the EPR moiety.

It was thus found that the resulting polymer was such a mixture that the following units (1) and (2) were respectively bonded to the terminals of EPR.

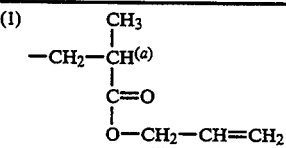

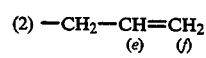

| Assignment | Chemical Shift Value (ppm: TMS Standard) |
|---|---|
| (a) | 2.5 |
| (b) | 4.5 |
| (c) | 5.9 |
| (d) | 5.2~5.4 |
| (e) | 5.8 |
| (f) | 5.0 |

It was found from the area ratio of the proton signal ($\delta = 0.7 \sim 1.7$ ppm) of the EPR moiety and the above described signal (d) and signal (f), the propylene content and molecular weight of the EPR moiety that the resulting polymer was such a mixture that 45 mole % of the above described unit (1) and 55 mole % of the above described unit (2) were respectively bonded to the terminals thereof per 1 mole of the EPR.

TABLE 2

| Examples | Polymerization Conditions of EPR | | Reaction Conditions of Compound I | | Terminal-modified EPR | | | |
|---|---|---|---|---|---|---|---|---|
| | Temp. (°C.) | Time (Hr) | Temp. (°C.) | Time (Hr) | Yield (g) | Mn (×10$^3$) | Mw/Mn | n Value in General Formula |
| 8 | −60 | 1 | −60 | 1 | 1.90 | 7.3 | 1.23 | 7 |
| 9 | −60 | 10 | −40 | 10 | 25.3 | 102.8 | 1.28 | 15 |
| 10 | −60 | 2 | 0 | 5 | 2.23 | 5.4 | 1.27 | 4 |
| 11 | −78 | 3 | −60 | 3 | 1.49 | 8.7 | 1.25 | 1 |
| 12 | −60 | 1 | −60 | 1 | 1.77 | 6.7 | 1.21 | 0.45 |

EXAMPLE 13

Living Polymerization of Propylene 100 ml of n-heptane was charged in a flask of 300 ml, sufficiently replaced by nitrogen gas, and then cooled at −60° C., to which 200 millimoles of propylene was added at the same temperature, followed by dissolving in the n-heptane. A solution of 15 millimoles of Al(C$_2$H$_5$)$_2$Cl in n-heptane and a solution of 1.5 millimole of V(2-methyl-1,3-butanedionato)$_3$ in toluene were then added thereto and stirred to start polymerization. The polymerization of propylene was carried out at −60° C. for 1 hour.

Reaction with Trimethylsiloxyethyl Methacrylate 100 millimoles of trimethylsiloxyethyl methacrylate (HEMA-Si) was added to the above described reaction system at −60° C., the temperature of the system was raised to 25° C. for 1 hour and the reaction with HEMA-Si was carried out at the same temperature. After 5 hours, the reaction solution was added to 500 ml of ethanol to precipitate a polymer. The resulting polymer was washed with methanol five times and dried at room temperature to obtain 0.86 g of a polymer.

The resulting polymer exhibited a GPC curve with a single peak and had an Mn of $2.7 \times 10^3$ and Mw/Mn of 1.15, near monodisperse.

When this polymer was subjected to IR analysis, there were found a peak due to absorption of carbonyl at 1740 cm$^{-1}$ and a broad peak due to absorption of hydroxy group at near 3450 cm$^{-1}$, but no absorption of trimethylsilyl group was found.

Moreover, as a result of $^1$H-NMR, a peak of the following chemical shift value was observed in addition to a peak ($\delta = 0.7 \sim 1.7$ ppm) due to the proton of the polypropylene. The proton of methyl in the trimethylsilyl group was not found.

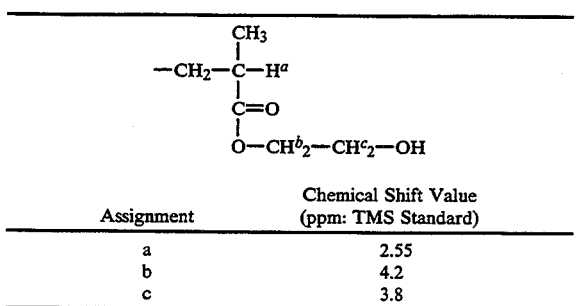

| Assignment | Chemical Shift Value (ppm: TMS Standard) |
|---|---|
| a | 2.55 |
| b | 4.2 |
| c | 3.8 |

It was found from the area ratio of the proton signal ($\delta = 0.7 \sim 1.7$ ppm) of the polypropylene moiety and the proton signal (c) of the above described substituent that the resulting polymer had one above described substituent unit incorporated at the terminal of polypropylene.

It is assumed from the above described results that the reaction product obtained by the reaction of the living propylene with HEMA-Si before contacting with the ethanol is a polymer having one substituent unit described below, bonded to the terminal of the polypropylene chain:

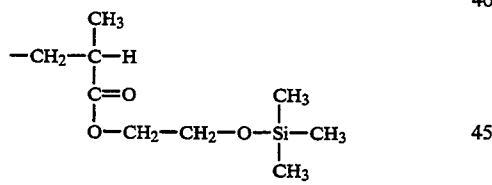

In order to determine the syndiotactic dyed fraction of the resulting polypropylene, in addition, living polymerization of propylene was carried out in the same manner as described above and the reaction solution was rapidly added to 500 ml of a solution of ethanol and hydrochloric acid cooled to $-78°$ C. to stop the polymerization. The separated polymer was washed with 500 ml of ethanol five times and dried at room temperature to obtain polypropylene.

Then, the resulting polypropylene was subjected to $^{13}$C-NMR analysis. The stereoregularity of the polypropylene, calculated from the multiplet intensity ratio of methyl carbon of spectrum, is shown in the following:

| Triad Fraction | | | Dyad Fraction[a] |
|---|---|---|---|
| [rr] | [rm] | [mm] | [r] |
| 0.627 | 0.317 | 0.056 | 0.786 |

[a] calculated from triad fraction

EXAMPLES 14 AND 15

Example 13 was repeated except that the polymerization conditions of propylene and reaction conditions of HEMA-Si were adjusted to as shown in Table 3 to obtain a terminal-modified polypropylene. The results are shown in Table 3.

EXAMPLE 16

In an analogous manner to Example 5, propylene was polymerized, 500 millimoles of HEMA-Si was added thereto at the same temperature and the reaction with HEMA-Si was carried out at $-60°$ C. for 10 hours. Subsequently, the procedure of Example 13 was carried out to obtain a terminal-modified polypropylene having the properties shown Table 3.

EXAMPLE 17

Propylene was polymerized in an analogous manner to Example 5 and the reaction with HEMA-Si was carried out in an analogous manner to Example 13 except that the reaction conditions were adjusted to as Table 3, thus obtaining a terminal-modified polypropylene having the properties shown in Table 3.

EXAMPLE 18

Example 13 was repeated except using 2-trimethylsiloxypropyl methacrylate (HPMA-Si) instead of HEMA-Si and adjusting the reaction conditions to as shown in Table 3, thus obtaining a polymer.

When this polymer was subjected to IR analysis, there were found a peak due to absorption of carbonyl at 1740 cm$^{-1}$ and a broad peak due to absorption of hydroxy group at near 3450 cm$^{-1}$, but no peak due to absorption of trimethylsilyl group. Moreover, as a result of $^1$H-NMR analysis, it was confirmed that the resulting polymer had one substituent unit described below at the terminal of the polypropylne.

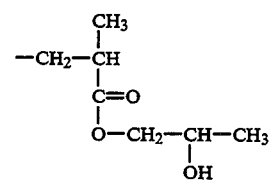

It is assumed from the above described results that the reaction product obtained by the reaction of the living propylene with HPMA-Si before contacting with the ethanol is a polymer having one substituent unit described below bonded to the terminal of the polypropylene chain:

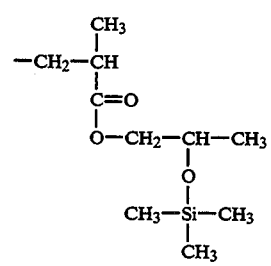

TABLE 3

| Examples | Polymerization Conditions of Propylene | | Reaction Conditions of Compound I | | Polymer | | | n Value in General Formula |
|---|---|---|---|---|---|---|---|---|
| | Temp. (°C.) | Time (Hr) | Temp. (°C.) | Time (Hr) | Yield (g) | Mn ($\times 10^3$) | Mw/Mn | |
| 13 | −60 | 1 | 25 | 5 | 0.86 | 2.7 | 1.15 | 1 |
| 14 | −60 | 1 | −40 | 10 | 0.87 | 2.8 | 1.16 | 3 |
| 15 | −60 | 2 | 0 | 5 | 1.83 | 5.9 | 1.14 | 2 |
| 16 | −60 | 10 | −40 | 15 | 26.1 | 79.5 | 1.29 | 7 |
| 17 | −78 | 3 | −60 | 1 | 0.59 | 6.4 | 1.17 | 1 |
| 18 | −60 | 1 | −60 | 1 | 0.91 | 2.9 | 1.16 | 1 |

EXAMPLE 19

Synthesis of Living Ethylene-Propylene Random Copolymer

Living EPR was synthesized in an analogous manner to Example 8.

Reaction with Trimethylsiloxyethyl Methacrylate 250 millimoles of trimethylsiloxyethyl methacrylate (HEMA-Si) was added to the above described reaction system at the same temperature, the temperature of the system was raised to 0° C. for 1 hour and the reaction with HEMA-Si was carried out while stirring at the same temperature. After 5 hours, the reaction solution was added to 500 ml of methanol to precipitate a polymer. The resulting polymer was washed with methanol five times and dried under reduced pressure at room temperature to obtain 1.85 g of a polymer.

The resulting polymer exhibited a GPC curve with a single peak and had an Mn of $6.8 \times 10^3$ and Mw/Mn of 1.22, near monodisperse.

When this polymer was subjected to IR analysis, there was found an absorption due to stretching vibration of carbonyl at 1740 cm$^{-1}$. At near 3450 cm$^{-1}$, a broad peak due to absorption of hydroxy group was found, but no absorption of trimethylsilyl group was found.

Moreover, as a result of $^1$H-NMR analysis, a peak of the following chemical shift value was observed in addition to a peak (δ=0.7∼1.7 ppm) due to the proton of the EPR moiety. A peak assigned to the methyl propton in the trimethylsilyl group was not found.

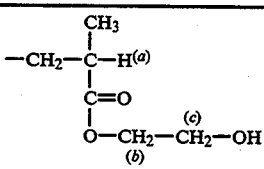

| Assignment | Chemical Shift Value (ppm: TMS Standard) |
|---|---|
| (a) | 2.55 |
| (b) | 4.2 |
| (c) | 3.8 |

It was found from the area ratio of the proton signal (δ=0.7∼1.7 ppm) of the EPR moiety and the above described proton signal (c), the propylene content and molecular weight of EPR that the resulting polymer had the above described two substituent units incorporated at the terminal of EPR, as described below.

It is assumed from the above described results that the reaction product obtained by the reaction of the living EPR with HEMA-Si before contacting with the methanol is a polymer having two substituent units described below, bonded to the terminals of the EPR chain:

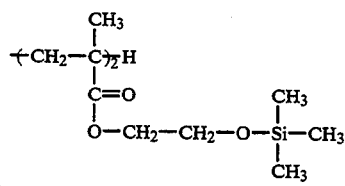

EXAMPLE 20

Example 19 was repeated except that the copolymerization conditions of ethylene-propylene and reaction conditions of HEMA-Si were adjusted to as shown in Table 4 to obtain a terminal-modified EPR.

On the other hand, ethylene and propylene were copolymerized in the same manner as described above, thus obtaining 3.72 g of EPR with an Mn of $13.0 \times 10^3$, Mw/Mn ratio of 1.21 and propylene content of 56.2 mole %.

EXAMPLE 21

In an analogous manner to Example 9, living EPR was synthesized.

500 millimoles of HEMA-Si was then added thereto at the same temperature, the temperature of the reaction system was raised to −40° C. for 1 hour and reaction with HEMA-Si was carried out for 15 hours. Subsequently, the procedure of Example 19 was repeated to obtain a terminal-modified EPR having the properties shown in Table 4.

EXAMPLE 22

In an analogous manner to Example 11, living EPR was synthesized.

250 millimoles of HEMA-Si was then added thereto at the same temperature, the temperature of the reaction system was raised to −20° C. for 1 hour and reaction with HEMA-Si was then carried out for 1 hour. Subsequently, the procedure of Example 19 was repeated to obtain a terminal-modified EPR having the properties shown in Table 4.

EXAMPLE 23

Example 19 was repeated except using 2-trimethylsiloxypropyl methacrylate (HPMA-Si) instead of HEMA-Si and adjusting the reaction conditions to as shown in Table 4, thus obtaining a polymer.

When this polymer was subjected to IR analysis, there was found an absorption due to stretching vibration of carbonyl at 1740 cm$^{-1}$. At near 3450 cm$^{-1}$, a broad peak due to absorption of hydroxy group was found, but no absorption of trimethylsilyl group was found.

Moreover, as a result of $^1$H-NMR analysis, it was confirmed that the resulting polymer had one substituent unit described below at the terminal of the EPR.

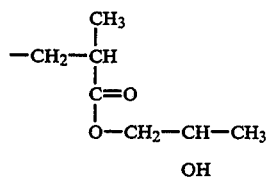

It is assumed from the above described results that the reaction product obtained by the reaction of the living EPR with HPMA-Si before contacting with the methanol was a polymer having one substituent unit described below bonded to the terminal of the EPR chain:

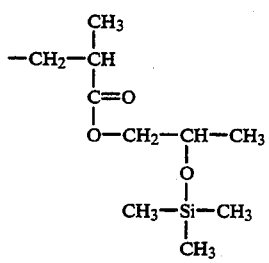

The resulting polymer exhibited a GPC curve with a single peak and had an Mn of $3.4 \times 10^3$ and Mw/Mn of 1.18, near monodisperse.

When this polymer was subjected to IR analysis, there were found a peak due to absorption of carbonyl at 1740 cm$^{-1}$.

Moreover, as a result of $^1$H-NMR, a peak of the following chemical shift value was observed in addition to a peak ($\delta = 0.7 \sim 1.7$ ppm) due to the polypropylene.

| Assignment | Chemical Shift Value (ppm: TMS Standard) |
|---|---|
| (a) | 4.2 |
| (b) | 2.5 |
| (c) | 2.3 |

It was found from the area ratio of the proton signal ($\delta = 0.7 \sim 1.7$ ppm) of the polypropylene moiety and the proton signal (a) of the methylene group in the ester moiety of DMA that polypropylene having the terminal thereof modified with DMA was obtained with a yield of 30 mole % (terminal modifying efficiency).

In order to determine the syndiotactic dyad fraction of the resulting polypropylene, in addition, living poly-

TABLE 4

| Examples | Polymerization Conditions of EPR Temp. (°C.) | Polymerization Conditions of EPR Time (Hr) | Reaction Conditions of Compound I Temp. (°C.) | Reaction Conditions of Compound I Time (Hr) | Terminal-modified EPR Yield (g) | Terminal-modified EPR Mn ($\times 10^3$) | Terminal-modified EPR Mw/Mn | n Value in General Formula |
|---|---|---|---|---|---|---|---|---|
| 19 | −60 | 1 | 0 | 5 | 1.85 | 6.8 | 1.22 | 2 |
| 20 | −60 | 2 | −40 | 5 | 3.72 | 13.0 | 1.22 | 3 |
| 21 | −60 | 10 | −40 | 15 | 25.1 | 102.5 | 1.27 | 6 |
| 22 | −78 | 3 | 20 | 1 | 1.57 | 8.8 | 1.25 | 1 |
| 23 | −60 | 1 | −60 | 3 | 1.80 | 7.0 | 1.24 | 1 |

EXAMPLE 24

Living Polymerization of Propylene 100 ml of n-heptane was charged in a flask of 300 ml, sufficiently replaced by nitrogen gas, and then cooled at −60° C., to which 200 millimoles of propylene was added at the same temperature, followed by dissolving in the n-heptane. A solution of 15 millimoles of Al(C$_2$H$_5$)$_2$Cl in n-heptane and a solution of 1.5 millimole of V(2-methyl-1,3-butanedionato)$_3$ in toluene were then added thereto and stirred to start polymerization. The polymerization of propylene was carried out at −60° C. for 1 hour.

Reaction with N,N-dimethylaminoethyl methacrylate 100 millimoles of N,N-dimethylaminoethyl methacrylate (DMA) was added to the above described reaction system at the same temperature, the temperature of the system was raised to 0° C. for 1 hour and the reaction with DMA was carried out while stirring. After 1 hour, the reaction solution was added to 500 m l of methanol to precipitate a polymer. The resulting polymer was washed with 500 ml of methanol five times and dried at room temperature to obtain 1.26 g of a polymer.

merization of propylene was carried out in the same manner as described above and the reaction solution was rapidly added to 500 ml of a solution of ethanol and hydrochloric acid cooled to −78° C. to stop the polymerization. The separated polymer was washed with 500 ml of methanol five times and dried at room temperature to obtain polypropylene.

Then, the resulting polypropylene was subjected to $^{13}$C-NMR analysis. The stereoregularity of the polypropylene, calculated from the multiplet intensity ratio of methyl carbon of spectrum, is shown in the following:

| Triad Fraction | | | Dyad Fraction[a] |
|---|---|---|---|
| [rr] | [rm] | [mm] | [r] |
| 0.628 | 0.318 | 0.054 | 0.787 |

[a] calculated from triad fraction

EXAMPLES 25 TO 27

Example 24 was repeated except that the polymerization conditions of propylene and reaction conditions of DMA were adjusted to as shown in Table 5 to obtain a terminal-modified polypropylene. The results are shown in Table 5.

EXAMPLE 28

In an analogous manner to Example 5, propylene was polymerized, 500 millimoles of DMA was then added thereto at the same temperature, the temperature of the reaction system was raised to 0° C. for 1 hour and reaction with DMA was carried out at 0° C. for 15 hours. Subsequently, the procedure of Example 24 was repeated to obtain a terminal-modified polypropylene having the properties shown in Table 5.

EXAMPLE 29

Propylene was polymerized in an analogous manner to Example 6 and the reaction with DMA was carried out in an analogous manner to Example 24 except that the reaction time was adjusted to 5 hours, thus obtaining a terminal-modified polypropylene having the properties shown in Table 5.

EXAMPLE 30

Example 24 was repeated except using N,N-diethylaminoethyl methacrylate (DEA) instead of DMA and adjusting the reaction time to 5 hours, thus obtaining a polymer.

When this polymer was subjected to IR analysis, there were found a peak due to absorption of carbonyl at 1740 cm$^{-1}$.

Moreover, as a result of $^1$H-NMR, a peak of the following chemical shift value was observed in addition to a peak ($\delta = 0.7 \sim 1.7$ ppm) due to the polypropylene.

```
        CH3
         |
  —CH2—CH
         |
         C=O
         |   (d)    (e)         (f)
         O—CH2—CH2—N    CH2—CH3
                       \
                        (f)
                        CH2—CH3
```

| Assignment | Chemical Shift Value (ppm: TMS Standard) |
|---|---|
| (d) | 4.1 |
| (e) | 2.7 |
| (f) | 2.6 |

It was found from the area ratio of the proton signal ($\delta = 0.7 \sim 1.7$ ppm) of the polypropylene moiety and the proton signal (e) of the methylene group in the ester moiety of DEA that polypropylene having the terminal thereof modified with DEA was obtained with a yield of 28 mole %.

EXAMPLE 31

Synthesis of Living Ethylene-Propylene Random Copolymer

Living EPR was synthesized in an analogous manner to Example 8.

Reaction with N,N-dimethylaminoethyl methacrylate 250 millimoles of N,N-dimethylaminoethyl methacrylate (DMA) was added to the above described reaction system at −60° C., the temperature of the system was raised to 20° C. for 1 hour and the reaction with DMA was carried out at the same temperature while stirring. After 2 hours, the reaction solution was added to 500 ml of methanol to precipitate a polymer. The resulting polymer was washed with 500 ml of methanol five times and dried under reduced pressure at room temperature to obtain 1.81 g of a polymer.

The resulting polymer exhibited a GPC curve with a single peak and had an Mn of $7.0 \times 10^3$ and Mw/Mn of 1.23, near monodisperse.

When this polymer was subjected to IR analysis, there was found an absorption due to stretching vibration of carbonyl at 1740 cm$^{-1}$.

Moreover, as a result of $^1$H-NMR analysis, a peak of the following chemical shift value was observed in addition to a peak ($\delta = 0.7 \sim 1.7$ ppm) due to the proton of the EPR moiety.

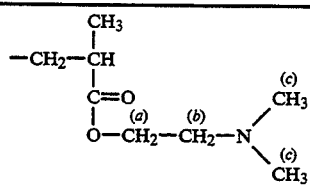

| Assignment | Chemical Shift Value (ppm: TMS Standard) |
|---|---|
| (a) | 4.2 |
| (b) | 2.5 |
| (c) | 2.3 |

It was found from the area ratio of the proton signal ($\delta = 0.7 \sim 1.7$ ppm) of the EPR, moiety and the above described proton signal (b), the polypropylene content and molecular weight of EPR that terminal-modified EPR having the terminal thereof modified with DMA was obtained with a yield of 82 mole % (terminal modifying efficiency).

EXAMPLE 32

800 ml of n-heptane was charged in an autoclave of 1500 ml, sufficiently replaced by nitrogen gas, and then

TABLE 5

| | Polymerization Conditions of Propylene | | Reaction Conditions of Compound I | | Polymer | | | Terminal-modifying Efficiency (mole %) |
|---|---|---|---|---|---|---|---|---|
| Examples | Temp. (°C.) | Time (Hr) | Temp. (°C.) | Time (Hr) | Yield (g) | Mn (×10$^3$) | Mw/Mn | |
| 24 | −60 | 1 | 0 | 1 | 1.26 | 3.4 | 1.18 | 30 |
| 25 | −60 | 2 | 0 | 5 | 2.35 | 6.7 | 1.22 | 45 |
| 26 | −60 | 3 | 25 | 1 | 3.42 | 9.8 | 1.19 | 77 |
| 27 | −70 | 3 | 25 | 5 | 1.76 | 5.8 | 1.14 | 100 |
| 28 | −60 | 15 | 0 | 15 | 38.8 | 118.3 | 1.31 | 80 |
| 29 | −78 | 3 | 0 | 5 | 0.62 | 6.8 | 1.18 | 34 |
| 30 | −60 | 1 | 0 | 5 | 1.28 | 3.3 | 1.21 | 28 | cooled at −60° C., to which 1.5 g of propylene was added at the same temperature, followed by liquefying and dissolving in the n-heptane. A solution of 40 millimoles of Al(C$_2$H$_5$)$_2$Cl in n-heptane and and a solution of 0.8 millimole of V(2-methyl-1,3-butanedionato)$_3$ in toluene were then added thereto and stirred at −60° C. for 10 minutes. After the system was evacuated to 680 mmHg, a mixed gas of ethylene and propylene (50/50 mole ratio) was continuously fed to the system and copolymerization of ethylenepropylene was carried out at −60° C. for 5 hours, thus synthesizing a living EPR.

500 millimoles of DMA was then added to the above described reaction system at the same temperature, the temperature of the reaction system was raised to 20° C. for 1 hour and the reaction with DMA was carried out for 10 hours, followed by treating in an analogous manner to Example 31 to obtain a terminal-modified EPR having the properties shown Table 6.

On the other hand, ethylene and propylene were copolymerized in the same manner as described above, thus obtaining 12.7 g of EPR with an Mn of 53.8×10$^3$, Mw/Mn ratio of 1.25 and propylene content of 47.1 mole %.

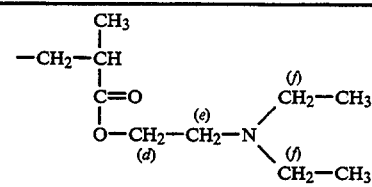

| Assignment | Chemical Shift Value (ppm: TMS Standard) |
|---|---|
| (d) | 4.1 |
| (e) | 2.7 |
| (f) | 2.6 |

It was found from the area ratio of the proton signal (δ=0.7∼1.7 ppm) of the EPR moiety and the above described proton signal (e), the polypropylene content and molecular weight of the EPR moiety that terminal-modified EPR having the terminal of the EPR chain modified with DEA was obtained with a yield of 38 mole % (terminal modifying efficiency).

TABLE 6

| Examples | Polymerization Conditions of EPR Temp. (°C.) | Time (Hr) | Reaction Conditions of Compound I Temp. (°C.) | Time (Hr) | Polymer Yield (g) | Mn (×10$^3$) | Mw/Mn | Terminal-modifying Efficiency (mole %) |
|---|---|---|---|---|---|---|---|---|
| 31 | −60 | 1 | 20 | 2 | 1.81 | 7.0 | 1.23 | 82 |
| 32 | −60 | 5 | 20 | 5 | 12.8 | 54.1 | 1.25 | 100 |
| 33 | −60 | 2 | 0 | 10 | 2.10 | 5.5 | 1.28 | 55 |
| 34 | −78 | 3 | 0 | 5 | 1.54 | 8.6 | 1.25 | 30 |
| 35 | −60 | 1 | 20 | 1 | 1.79 | 7.1 | 1.24 | 38 |

EXAMPLE 33

Living EPR was synthesized in an analogous manner to Example 10.

250 millimoles of DMA was then added at the same temperature and the reaction with DMA was carried out at 0° C. for 10 hours, followed by treating in an analogous manner to Example 31 to obtain a terminal-modified EPR having the properties shown Table 6.

EXAMPLE 34

Living EPR was synthesized in an analogous manner to Example 11.

250 millimoles of DMA was then added to the above described reaction system at the same temperature, the temperature of the reaction system was raised to 0° C. for 1 hour and the reaction with DMA was carried out for 5 hours, followed by treating in an analogous manner to Example 31 to obtain a terminal-modified EPR having the properties shown Table 6.

EXAMPLE 35

Example 31 was repeated except using N,N-diethylaminoethyl methacrylate (DEA) instead of DMA and adjusting the reaction conditions to as shown in Table 6, thus obtaining a polymer.

When this polymer was subjected to IR analysis, there was found an absorption due to stretching vibration of carbonyl at 1740 cm$^{-1}$.

Moreover, as a result of $^1$H-NMR, a peak of the following chemical shift value was observed in addition to a peak (δ=0.7∼1.7 ppm) due to EPR.

EXAMPLE 36

Living Polymerization of Propylene 100 ml of n-heptane was charged in a flask of 300 ml, sufficiently replaced by nitrogen gas, and then cooled at −60° C., to which 200 millimoles of propylene was added at the same temperature, followed by dissolving in the n-heptane. A solution of 15 millimoles of Al(C$_2$H$_5$)$_2$Cl in n-heptane and a solution of 1.5 millimole of V(2-methyl-1,3-butanedionato)$_3$ in toluene were then added thereto and stirred to start polymerization. The polymerization of propylene was carried out at −60° C. for 1 hour.

Reaction with Glycidyl Methacrylate 100 millimoles of glycidyl methacrylate (GMA) was added to the above described reaction system at −60° C., the temperature of the system was raised to 25° C. for 1 hour and the reaction with GMA was carried out by stirring at the same temperature. After 5 hours, the reaction solution was added to 500 ml of ethanol to precipitate a polymer. The resulting polymer was again dissolved in n-heptane and subjected to centrifugal separation to obtain a supernatant. The supernatant was poured in 500 ml of methanol to precipitate again a polymer. The resulting polymer was washed with methanol five times and dried under reduced pressure at room temperature to obtain 1.15 g of a polymer.

The resulting polymer exhibited a GPC curve with a single peak and had an Mn of 4.2×10$^3$ and Mw/Mn of 1.17, near monodisperse.

When this polymer was subjected to IR analysis, there was found an absorption due to stretching vibration of carbonyl group at 1740 cm$^{-1}$.

Moreover, as a result of $^1$H-NMR, a peak of the following chemical shift value was observed in addition to a peak ($\delta = 0.7 \sim 1.7$ ppm) due to the proton of the polypropylene.

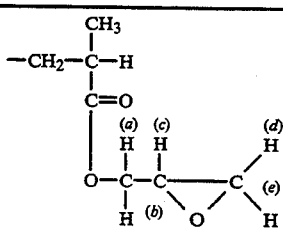

| Assignment | Chemical Shift Value (ppm: TMS Standard) |
|---|---|
| (a) | 4.3 |
| (b) | 3.9 |
| (c) | 3.2 |
| (d) | 2.8 |
| (e) | 2.6 |

It was found from the area ratio of the proton signal ($\delta = 0.7 \sim 1.7$ ppm) of the polypropylene moiety and the above described proton signal (d) that the resulting polymer had 13 GMA units incorporated at the terminals of polypropylene, as described below.

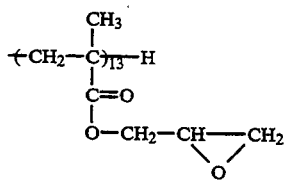

In order to determine the syndiotactic dyad fraction of the resulting polypropylene, in addition, living polymerization of propylene was carried out in the same manner as described above and the reaction solution was rapidly added to 500 ml of a solution of ethanol and hydrochloric acid cooled to $-78°$ C. to stop the polymerization. The separated polymer was washed with 500 ml of ethanol five times and dried at room temperature to obtain polypropylene.

Then, the resulting polypropylene was subjected to $^{13}$C-NMR analysis. The stereoregularity of the polypropylene, calculated from the multiplet intensity ratio of methyl carbon of spectrum, is shown in the following:

| Triad Fraction | | | Dyad Fraction[a] |
|---|---|---|---|
| [rr] | [rm] | [mm] | [r] |
| 0.625 | 0.320 | 0.055 | 0.785 |

[a] calculated from triad fraction

EXAMPLES 37 TO 39

Example 36 was repeated except that the reaction conditions of propylene and GMA were adjusted to as shown in Table 7 to obtain a terminal-modified polypropylene. The results are shown in Table 7.

EXAMPLE 40

In an analogous manner to Example 5, propylene was polymerized, 500 millimoles of GMA was then added thereto at the same temperature, the temperature of the system was raised to 0° C. for 1 hour and reaction with GMA was carried out at 0° C. for 15 hours. Subsequently, the procedure of Example 36 was repeated to obtain a terminal-modified polypropylene having the properties shown in Table 7.

EXAMPLE 41

Propylene was polymerized in an analogous manner to Example 6 and the reaction with GMA was then carried out in an analogous manner to Example 36 except that the reaction time was adjusted to 5 hours, thus obtaining a terminal-modified polypropylene having the properties shown in Table 7.

TABLE 7

| Examples | Polymerization Conditions of Propylene | | Reaction Conditions of Compound I | | Polymer | | | |
|---|---|---|---|---|---|---|---|---|
| | Temp. (°C.) | Time (Hr) | Temp. (°C.) | Time (Hr) | Yield (g) | Mn (×10$^3$) | Mw/Mn | n Value in General Formula |
| 36 | −60 | 1 | 25 | 5 | 1.15 | 4.2 | 1.17 | 13 |
| 37 | −60 | 1 | −40 | 3 | 0.95 | 3.6 | 1.14 | 0.8 |
| 38 | −60 | 3 | 25 | 10 | 3.28 | 11.8 | 1.15 | 23 |
| 39 | −70 | 2 | 0 | 5 | 1.25 | 4.3 | 1.19 | 7 |
| 40 | −60 | 15 | 0 | 15 | 42.0 | 109.7 | 1.30 | 11 |
| 41 | −78 | 3 | 25 | 5 | 0.61 | 7.6 | 1.18 | 15 |

EXAMPLE 42

Synthesis of Living Ethylene-Propylene Random Copolymer

Living EPR was synthesized in an analogous manner to Example 8.

Reaction with Glycidyl Methacrylate 250 millimoles of glycidyl methacrylate (GMA) was added to the above described reaction system at −60° C., the temperature of the system was raised to 0° C. for 1 hour and the reaction with GMA was carried out by stirring at the same temperature. After 5 hours, the reaction solution was added to 500 ml of methanol to precipitate a polymer. The resulting polymer was again dissolved in n-heptane and subjected to centrifugal separation to obtain a supernatant. The supernatant was poured in 500 ml of methanol to precipitate again a polymer. The resulting polymer was washed with methanol five times and dried under reduced pressure at room temperature to obtain 1.92 g of a polymer.

The resulting polymer exhibited a GPC curve with a single peak and had an Mn of $7.1 \times 10^3$ and Mw/Mn of 1.23, near monodisperse.

When this polymer was subjected to IR analysis, there was found an absorption due to stretching vibration of carbonyl group at 1740 cm$^{-1}$.

Moreover, as a result of $^1$H-NMR, a peak of the following chemical shift value was observed in addition to a peak ($\delta=0.7\sim1.7$ ppm) due to the proton of the EPR moiety.

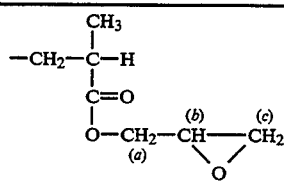

| Assignment | Chemical Shift Value (ppm: TMS Standard) |
|---|---|
| (a) | 3.9, 4.3 |
| (b) | 3.2 |
| (c) | 2.6, 2.8 |

It was found from the area ratio of the proton signal ($\delta=0.7\sim1.7$ ppm) of the EPR moiety and the above described proton signal (c), the propylene content and molecular weight of EPR that the resulting polymer had 7 GMA units incorporated at the terminal of EPR, as described below.

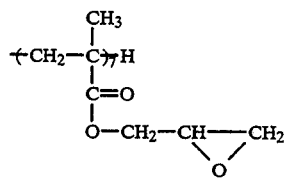

EXAMPLE 43

Living EPR was synthesized in an analogous manner to Example 9.

500 millimoles of GMA was then added to thereto at the same temperature, the temperature of the reaction system was raised to 20° C. for 1 hour and the reaction with GMA was carried out for 10 hours, followed by treating in an analogous manner to Example 42 to obtain a terminal-modified EPR having the properties shown in Table 8.

EXAMPLE 44

Living EPR was synthesized in an analogous manner to Example 10.

250 millimoles of GMA was then added thereto at the same temperature and the reaction with GMA was carried out at −60° C. for 3 hours, followed by treating in an analogous manner to Example 42 to obtain a terminal-modified EPR having the properties shown Table 8.

EXAMPLE 45

Living EPR was synthesized in an analogous manner to Example 11.

250 millimoles of GMA was then added to thereto at the same temperature, the temperature of the reaction system was raised to −20° C. for 1 hour and the reaction with GMA was carried out for 5 hours, followed by treating in an analogous manner to Example 42 to obtain a terminal-modified EPR having the properties shown in Table 8.

EXAMPLE 46

Example 42 was repeated except using glycidyl acrylate (GA) instead of GMA and adjusting the reaction conditions to as shown in Table 8, thus obtaining a polymer.

When this polymer was subjected to IR analysis, there was found an absorption due to stretching vibration of carbonyl at 1740 cm$^{-1}$.

Moreover, as a result of $^1$H-NMR analysis, it was confirmed that the resulting polymer had the following two substituent units bonded at the terminal of EPR.

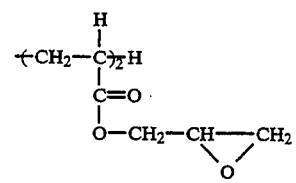

TABLE 8

| Examples | Polymerization Conditions of Propylene | | Reaction Conditions of Compound I | | Polymer | | | n Value in General Formula |
|---|---|---|---|---|---|---|---|---|
| | Temp. (°C.) | Time (Hr) | Temp. (°C.) | Time (Hr) | Yield (g) | Mn (×10³) | Mw/Mn | |
| 42 | −60 | 1 | 0 | 5 | 1.92 | 7.1 | 1.23 | 7 |
| 43 | −60 | 10 | 20 | 10 | 25.7 | 103.8 | 1.29 | 21 |
| 44 | −60 | 2 | −60 | 3 | 2.19 | 5.2 | 1.26 | 1 |
| 45 | −78 | 3 | −20 | 5 | 1.57 | 8.9 | 1.25 | 3 |
| 46 | −60 | 1 | 0 | 1 | 1.79 | 7.1 | 1.24 | 2 |

EXAMPLE 47

100 ml of n-heptane was charged in a flask of 300 ml, sufficiently replaced by nitrogen gas, and then cooled at −60° C., to which 200 millimoles of propylene was added at the same temperature, followed by liquefying and dissolving in the n-heptane. A solution of 15 millimoles of Al(C$_2$H$_5$)$_2$Cl in n-heptane and a solution of 1.5 millimole of V(2-methyl-1,3-butanedionato)$_3$ in toluene were then added thereto and stirred to start polymerization. The polymerization of propylene was carried out at −60° C. for 1 hour. 100 millimoles of methacrylic acid chloride (MACl) was added thereto at −60° C. and reacted for 1 hour at the same temperatrue.

Then, the reaction solution was poured in 500 ml of ethanol to precipitate a polymer. The precipitate was dissolved again in n-heptane and subjected to centrifugal separation to obtain a supernatant, which was then poured in 500 ml of methanol to precipitate again a polymer. The resulting polymer was washed with methanol five times and dried under reduced pressure at room temperature to obtain 1.08 g of a polymer.

The resulting polymer exhibited a GPC curve with a single peak and had an Mn of $3.6 \times 10^3$ and Mw/Mn of 1.21, near monodisperse.

When this polymer was subjected to analysis of the infrared absorption spectrum (IR), there was found a peak due to absorption of carbonyl group at 1740 cm$^{-1}$.

Moreover, as a result of NMR analysis, a peak of the following chemical shift value was observed in addition to a peak ($\delta = 0.7 \sim 1.7$ pm) due to the proton of the polypropylene. It was found that methyl methacrylate (MMA) was bonded to the trerminal of the polypropylene chain.

$$\begin{array}{c} \text{CH}_3 \\ {}^{(b)} \quad | \quad {}^{(c)} \\ +\text{CH}_2-\text{C}+\text{H} \\ | \\ \text{C}=\text{O}_{(a)} \\ | \\ \text{O}-\text{CH}_3 \end{array}$$

| Assignment | Chemical Shift Value (ppm: TMS Standard) |
|---|---|
| (a) | 3.6 |
| (b) | 1.9 |
| (c) | 2.5 |

It was also found from the area ratio of the proton signal ($\delta = 0.7 \sim 1.7$ ppm) of the polypropylene moiety and the proton signal (a) of MMA unit that the resulting polymer had 7 MMA units incorporated at the terminals of polypropylene.

It is assumed from the above described results that the reaction product obtained by reaction of the living polypropylene and MACl was a polymer having the following 7 MACl units bonded to the terminal of the polypropylene chain and the MACl unit was converted into MMA unit through contacting with methanol.

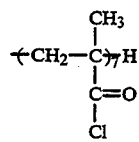

In order to determine the syndiotactic dyad fraction of the resulting polypropylene, in addition, living polymerization of propylene was carried out in the same manner as described above and the reaction solution was rapidly added to 500 ml of a solution of methanol and hydrochloric acid cooled to $-78°$ C. to stop the polymerization. The separated polymer was washed with 500 ml of methanol five times and dried at room temperature to obtain polypropylene.

Then, the resulting polypropylene was subjected to —C-NMR analysis. The stereoregularity of the polypropylene, calculated from the multiplet intensity ratio of methyl carbon of spectrum, is shown in the following:

| Triad Fraction | | | Dyad Fraction[a] |
|---|---|---|---|
| [rr] | [rm] | [mm] | [r] |
| 0.629 | 0.314 | 0.057 | 0.786 |

[a] calculated from triad fraction

EXAMPLES 48 TO 50

Example 47 was repeated except that the reaction conditions of propylene and MACl were adjusted to as shown in Table 9 to obtain a terminal-modified polypropylene. The results are shown in Table 9.

EXAMPLE 51

In an analogous manner to Example 5, propylene was polymerized, 500 millimoles of MACl was then added thereto at the same temperature, the temperature of the reaction system was raised to $-40°$ C. for 1 hour and reaction with MACl was carried out at $-40°$ C. for 5 hours. Subsequently, the procedure of Example 47 was carried out to obtain a terminal-modified polypropylene having the properties shown Table 9.

EXAMPLE 52

Propylene was polymerized in an analogous manner to Example 6 and the reaction with MACl was then carried out in an analogous manner to Example 47 except that the reaction conditions were adjusted to 0° C. and 3 hours, thus obtaining a terminal-modified polypropylene having the properties shown in Table 9.

EXAMPLE 53

Example 47 was repeated except using acrylic acid chloride in place of MACL to obtain a polymer having the properties as shown in Table 9.

When this polymer was subjected to IR analysis, there was found a peak due to absorption of carbonyl at 1740 cm$^{-1}$. Moreover, as a result of NMR analysis, a peak of the following chemical shift value was observed in addition to a peak ($\delta = 0.7 \sim 1.7$ pm) due to the polypropylene and it was found that methyl acrylate (MA) unit was bonded to the polypropylene chain.

$$\begin{array}{c} {}^{(d)} \\ \text{H} \\ {}^{(b)} \quad | \quad {}^{(c)} \\ +\text{CH}_2-\text{C}+\text{H} \\ | \\ \text{C}=\text{O} \\ | \quad {}^{(a)} \\ \text{O}-\text{CH}_3 \end{array}$$

| Assignment | Chemical Shift Value (ppm: TMS Standard) |
|---|---|
| (a) | 3.7 |
| (b) | 1.9 |
| (c) | 2.3 |
| (d) | 2.5 |

It was found from the area ratio of the proton signal ($\delta = 0.7 \sim 1.7$ ppm) of the polypropylene moiety and the of MA unit that the resulting polymer had 4.0 MA units incorporated at the terminals of the polypropylene chain.

It is assumed from the above described results that the reaction product obtained by reaction of the living polypropylene and acrylic acid chloride was a polymer having the following 4.0 acrylic acid chloride units bonded to the terminal of the polypropylene chain and the acrylic acid chloride unit was converted into MA unit through contacting with methanol.

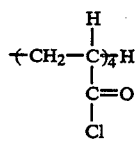

TABLE 9

| Examples | Polymerization Conditions of Propylene | | Reaction Conditions of Compound I | | Polymer | | | n Value in General Formula |
|---|---|---|---|---|---|---|---|---|
| | Temp. (°C.) | Time (Hr) | Temp. (°C.) | Time (Hr) | Yield (g) | Mn (×10³) | Mw/Mn | |
| 47 | −60 | 1 | −60 | 1 | 1.08 | 3.6 | 1.21 | 7 |
| 48 | −60 | 1 | −40 | 3 | 1.15 | 4.0 | 1.17 | 11 |
| 49 | −60 | 3 | −60 | 1 | 3.36 | 10.2 | 1.18 | 8 |
| 50 | −70 | 2 | 0 | 1 | 1.27 | 4.3 | 1.15 | 10 |
| 51 | −60 | 15 | −40 | 5 | 42.9 | 105.1 | 1.27 | 15 |
| 52 | −78 | 3 | 0 | 3 | 0.72 | 7.6 | 1.15 | 3 |
| 53 | −60 | 1 | −60 | 1 | 0.96 | 3.5 | 1.20 | 4 |

EXAMPLE 54

Synthesis of Living Ethylene-Propylene Random Copolymer

Living EPR was synthesized in an analogous manner to Example 8.

Reaction with Methacrylic Acid Chloride 250 millimoles of methacrylic acid chloride (MACl) was added to the above described reaction system at −60° C. and reacted at the same temperature for 1 hour. Then, the reaction solution was added to 500 ml of methanol to precipitate a polymer. The resulting polymer was again dissolved in n-heptane and subjected to centrifugal separation to obtain a supernatant. This supernatant was poured in 500 ml of methanol to precipitate again the polymer. The resulting polymer was washed with methanol five times and dried under reduced pressure at room temperature to obtain 1.95 g of a polymer.

The resulting polymer exhibited a GPC curve with a single peak and had an Mn of $7.1 \times 10^3$ and Mw/Mn of 1.23, near monodisperse.

When this polymer was subjected to IR analysis, there was found an absorption due to stretching vibration of carbonyl at 1740 cm$^{-1}$.

Moreover, as a result of $^1$H-NMR analysis, a peak of the following chemical shift value was observed in addition to a peak ($\delta = 0.7 \sim 1.7$ ppm) due to the proton of the EPR moiety and it was found that methyl methacrylate (MMA) unit was bonded to the terminal of EPR chain.

$$\begin{array}{c} \text{CH}_3 \\ {}_{(b)} \mid {}_{(c)} \\ {\text{+CH}_2\text{—C+}_{\overline{n}}\text{H}} \\ \mid \\ \text{C=O} \\ \mid \quad {}_{(a)} \\ \text{O—CH}_3 \end{array}$$

| Assignment | Chemical Shift Value (ppm: TMS Standard) |
|---|---|
| (a) | 3.6 |
| (b) | 1.9 |
| (c) | 2.5 |

It was found from the area ratio of the proton signal ($\delta = 0.7 \sim 1.7$ ppm) of the EPR moiety and the above described proton signal (a), the propylene content and molecular weight of EPR that 6 MMA units were bonded to the terminal of the EPR chain.

It is assumed from the above described results that the reaction product obtained by the reaction of the living EPR with MACl is a polymer having 6 MACL units, as described below, bonded to the terminal of the EPR chain and the MACl unit was converted into MMA unit by contacting with methanol.

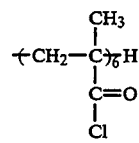

EXAMPLE 55

In an analogous manner to Example 9, living EPR was synthesized.

500 millimoles of MACl was then added thereto at the same temperature, the temperature of the reaction system was raised to −40° C. for 1 hour and the reaction with MACl was carried out for 5 hours. Subsequently, the procedure of Example 54 was repeated to obtain a terminal-modified EPR having the properties shown in Table 10.

EXAMPLE 56

In an analogous manner to Example 10, living EPR was synthesized.

250 millimoles of MACl was then added thereto at the same temperature, the temperature of the reaction system was raised to 0° C. and the reaction with MACl was carried out at 0° C. for 1 hour. Subsequently, the procedure of Example 54 was repeated to obtain a terminal-modified EPR having the properties shown in Table 10.

EXAMPLE 57

In an analogous manner to Example 11, living EPR was synthesized.

250 millimoles of MACl was then added thereto at the same temperature and the reaction with MACl was carried out at −60° C. for 3 hours. Subsequently, the rocedure of Example 54 was repeated to obtain a terminal-modified EPR having the properties shown in Table 10.

EXAMPLE 58

Example 54 was repeated except using acrylic acid chloride instead of MACl and adjusting the reaction conditions to as shown in Table 10, thus obtaining a polymer.

When this polymer was subjected to IR analysis, there was found an absorption due to stretching vibration of carbonyl at 1740 cm$^{-1}$.

Moreover, as a result of $^1$H-NMR analysis, a peak of the following chemical shift value was observed in addition to a peak ($\delta = 0.7 \sim 1.7$ ppm) due to the proton of the EPR moiety and it was found that methyl acrylate (MA) unit was bonded to the terminal of EPR chain.

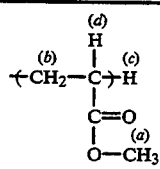

| Assignment | Chemical Shift Value (ppm: TMS Standard) |
|---|---|
| (a) | 3.7 |
| (b) | 1.9 |
| (c) | 2.3 |
| (d) | 2.5 |

It was found from the area ratio of the proton signal ($\delta = 0.7 \sim 1.7$ ppm) of the EPR moiety and propylene signal (a) of the MA unit, the propylene content and molecular weight of the EPR moiety that 3 MA units were bonded to the terminal of EPR.

It is assumed from the above described results that the reaction product obtained by the reaction of the living EPR with the acrylic acid chloride was a polymer having 3 acrylic acid chloride units, as described below, bonded to the terminal of the EPR chain and the acrylic acid chloride unit was converted into MA unit by contacting with methanol.

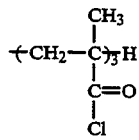

TABLE 10

| Examples | Polymerization Conditions of EPR | | Reaction Conditions of Compound I | | Terminal-modified EPR | | | |
|---|---|---|---|---|---|---|---|---|
| | Temp. (°C.) | Time (Hr) | Temp. (°C.) | Time (Hr) | Yield (g) | Mn ($\times 10^3$) | Mw/Mn | n Value in General Formula |
| 54 | −60 | 1 | −60 | 1 | 1.95 | 7.1 | 1.23 | 6 |
| 55 | −60 | 10 | −40 | 5 | 26.1 | 104.5 | 1.28 | 13 |
| 56 | −60 | 2 | 0 | 1 | 2.10 | 5.2 | 1.27 | 2 |
| 57 | −78 | 3 | −60 | 3 | 1.55 | 8.6 | 1.25 | 1 |
| 58 | −60 | 1 | −60 | 1 | 1.86 | 6.9 | 1.23 | 3 |

Utility and Possibility on Commercial Scale

The polymer of the present invention is available for a compatibilizer, a polymer modifier capable of imparting dyeing property or adhesiveness to poyymers, a viscosity index-improver such as lubricating oils, etc.

We claim:

1. A process for the production of a terminal-modified linear polyolefin in which the polyolefin is polypropylene or ethylene-propylene random copolymer and one of the terminals of the polyolefin is modified with a substituent represented by the following General Formula:

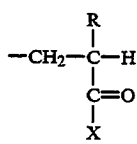

wherein R is a hydrogen atom or methyl group, X is a halogen atom or OZ group, wherein Z is $C_mH_{2m} \cdot OSi(CH_3)_3$ or $C_mH_{2m} \cdot OH$, where m is 2 or 3, or Z is a group represented by the following General Formula:

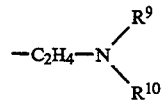

wherein $R^9$ and $R^{10}$ are independently a methyl group or an ethyl group, or Z is a group represented by the following formula:

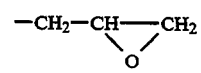

which process comprises polymerizing propylene or random-copolymerizing ethylene and propylene in the presence of a catalyst consisting of an organic aluminum compound and a vanadium compound represented by the following General Formula:

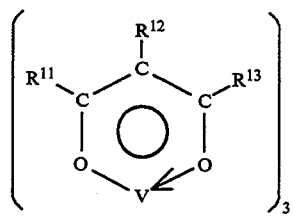

wherein $R^{11}$ to $R^{13}$ are hydrogen atoms or hydrocarbon groups of 1 to 8 carbon atoms and at least one of $R^{11}$ to $R^{13}$ must be a hydrogen atom, but all of $R^{11}$ to $R^{13}$ must not be hydrogen atoms, thus obtaining respectively living polypropylene or living ethylene-propylene copolymers, and then reacting the polypropylene or ethylene-propylene copolymer with a methacrylic acid or acrylic acid derivative represented by the following General Formula:

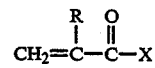

wherein R and X have the same meanings as described above.

2. A terminal-modified polyolefin produced by the process of claim 1.

3. A process according to claim 1, wherein X is a halogen atom.

4. A process according to claim 1 in which X is an OZ group.

* * * * *